United States Patent
Parks et al.

(10) Patent No.: US 7,384,067 B2
(45) Date of Patent: Jun. 10, 2008

(54) ROLLOVER PROTECTION FOR MOTOR VEHICLES

(75) Inventors: Brent A. Parks, Englewood, CO (US); Heath Knight-Newbury, Brighton (GB); David Parkinson, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 205 days.

(21) Appl. No.: 11/327,801

(22) Filed: Jan. 6, 2006

(65) Prior Publication Data

US 2007/0205592 A1 Sep. 6, 2007

(51) Int. Cl.
*B60R 21/13* (2006.01)
*B60N 2/427* (2006.01)

(52) U.S. Cl. .......... 280/756; 296/65.13; 296/69; 297/216.12; 297/216.13; 297/216.17

(58) Field of Classification Search .......... 280/756; 296/68.1, 65.13, 65.16, 65.17, 65.18, 69; 297/216.7, 216.12, 216.13, 216.15, 216.16, 297/216.17, 217.7
See application file for complete search history.

(56) References Cited

U.S. PATENT DOCUMENTS

| | | | | |
|---|---|---|---|---|
| 3,922,029 A | * | 11/1975 | Urai | 296/68.1 |
| 5,056,816 A | * | 10/1991 | Lutze et al. | 280/751 |
| 5,110,185 A | | 5/1992 | Schmutz et al. | |
| 5,203,600 A | * | 4/1993 | Watanabe et al. | 296/68.1 |
| 5,205,585 A | * | 4/1993 | Reuber et al. | 280/753 |
| 5,458,396 A | | 10/1995 | Rost | |
| 5,626,361 A | * | 5/1997 | Heiner | 280/756 |
| 5,662,376 A | * | 9/1997 | Breuer et al. | 297/216.2 |
| 5,746,476 A | * | 5/1998 | Novak et al. | 297/216.13 |
| 5,839,758 A | * | 11/1998 | Finch et al. | 280/756 |
| 5,927,803 A | | 7/1999 | Hehl et al. | |
| 6,352,285 B1 | | 3/2002 | Schulte et al. | |
| 6,511,095 B1 | * | 1/2003 | Kober et al. | 280/756 |

(Continued)

FOREIGN PATENT DOCUMENTS

DE 3822461 1/1990

(Continued)

*Primary Examiner*—Christopher Bottorff
*Assistant Examiner*—Karen Jane J. Amores
(74) *Attorney, Agent, or Firm*—Sally J Brown; Madson & Austin (57) ABSTRACT

The present invention relates to a new type of safety system that is designed to protect a vehicle occupant during a rollover crash. The safety system will generally include a vehicle seat and a sensor. The sensor is designed to sense the occurrence of a rollover crash. The safety system also includes a support member that has an undeployed mode and a deployed mode. The support member converts from the undeployed mode into the deployed mode when a signal is received from the sensor indicating a rollover. The support member will generally be housed within the vehicle seat when the support member is in the undeployed mode. The support member is also anchored to the floor pan of the vehicle. When the support member is deployed into the deployed mode, the support member is disposed in effective engagement with the vehicle roof to limit movement of the roof toward the vehicle seat during rollover conditions. Accordingly, the likelihood that the vehicle roof will be collapsed onto the vehicle occupant during a crash is significantly reduced.

19 Claims, 5 Drawing Sheets

U.S. PATENT DOCUMENTS

| | | | |
|---|---|---|---|
| 6,742,838 B1* | 6/2004 | Swierczewski | 297/216.1 |
| 6,767,064 B2 | 7/2004 | Veine et al. | |
| 6,784,379 B2* | 8/2004 | Breed et al. | 177/144 |
| 6,988,744 B2* | 1/2006 | Muller | 280/756 |
| 7,097,242 B2* | 8/2006 | Farquhar et al. | 297/216.12 |
| 7,175,199 B2* | 2/2007 | Muller | 280/756 |
| 7,198,294 B2* | 4/2007 | Welch | 280/756 |
| 2004/0056464 A1* | 3/2004 | De Gaillard et al. | 280/756 |
| 2005/0082808 A1* | 4/2005 | Wildig et al. | 280/756 |
| 2006/0001300 A1* | 1/2006 | Harcourt et al. | 297/250.1 |
| 2006/0131862 A1* | 6/2006 | Hermann et al. | 280/756 |
| 2007/0029444 A1* | 2/2007 | Mercier et al. | 244/122 R |
| 2007/0085697 A1* | 4/2007 | Breed | 340/825.72 |
| 2007/0158983 A1* | 7/2007 | Yokota et al. | 297/216.1 |
| 2007/0200400 A1* | 8/2007 | Tang et al. | 297/216.12 |
| 2007/0205592 A1* | 9/2007 | Parks et al. | 280/756 |
| 2007/0205593 A1* | 9/2007 | Lang | 280/756 |

FOREIGN PATENT DOCUMENTS

| | | |
|---|---|---|
| DE | 3927265 | 2/1991 |
| DE | 4342400 | 2/1995 |
| DE | 19650593 | 6/1998 |
| DE | 19838989 | 11/1999 |
| DE | 10016239 | 10/2001 |
| EP | 0504482 | 9/1992 |
| EP | 1522470 | 4/2005 |

* cited by examiner

ROLLOVER PROTECTION FOR MOTOR VEHICLES

BACKGROUND OF THE INVENTION

1. Technical Field

The present invention relates to a system that protects a vehicle occupant during a rollover crash. More specifically, the present invention is a new type of safety system that is designed to prevent the vehicle roof from collapsing onto the vehicle occupant during a rollover crash.

2. Description of Related Art

Rollover crashes or accidents are some of the most serious accidents involving automobiles. As its name implies, a rollover crash is one in which the vehicle literally rolls over-i.e., the vehicle becomes inverted (at least for a short period of time) such that the vehicle's tires are positioned above the vehicle roof. Rollover accidents are extremely dangerous for convertible vehicles as there is no structure that will protect the occupant from harmfully impacting the ground. In fact, occupants of a convertible vehicle involved in a rollover accident are often killed or seriously injured.

Rollover accidents are a serious concern for non-convertible vehicles as well in that such accidents can cause injury/death to vehicle occupants. Generally, the occupants of a vehicle having a roof will be injured or killed in a rollover due to (1) the vehicle roof being forced down onto the occupant (thereby causing head trauma, spinal trauma, etc.) and/or (2) the occupant's head or torso being ejected through an opening in the vehicle such that the body part contacts the ground. Given these problems, a vehicle with a roof is not necessarily safer than a convertible vehicle in a rollover crash.

Because of the significant dangers/risks associated with rollover conditions, significant research and development has been conducted into constructing safety systems that protect vehicle occupants in a rollover. Some of the currently known systems include seatbelt pretensioning systems and side curtain airbag systems. While these systems provide increased protection to the vehicle occupant, such systems generally rely on specific anchorage points within the vehicle that secure the seatbelt system in place and restrain the occupant during the rollover. However, as the roof and/or side structure of the vehicle is generally deformed during a rollover, these anchorage points may move and/or become inoperable, thereby diminishing the overall effectiveness and ability of these systems to adequately protect occupants during the crash.

Other systems designed for rollover protection include deployable members, such as deployable rollbars or other structures. These systems are designed typically to support the entire weight/impact of the vehicle during a rollover. Unfortunately, for many passenger vehicles such as SUVs, the inclusion of the rollbar makes the vehicle interior cumbersome and unappealing.

Likewise, many of the rollbars or other deployable members create additional problems in that they are rigid systems that do not allow the roof to deform as part of the rollover incident. As is known in the art, it is sometimes desirable to have all or a portion of the vehicle roof deform during the rollover in that this deformation will actually dissipate some of the energy of the crash. If the roof/vehicle structure is so rigid such that no deformation occurs, there is a risk that the energy/angular momentum of the rollover crash will not be rapidly dissipated, which in turn, increases the risk that the vehicle will roll multiple times during the incident. Obviously, the more times the vehicle rolls during the crash, the greater the likelihood that the occupant will be injured. Accordingly, any safety system that does not allow all or a portion of the roof/vehicle to deform and dissipate some of the crash energy will generally be disfavored.

Other options for rollover safety systems involving the "A-pillar" and the "B-pillar" of vehicles involve making the "A-pillar" and the "B-pillar" more resistance to buckling or deformation. However, the problem with this method is that such a system adds significant unwanted weight and bulk to the vehicle, which increases the vehicle centre of gravity and hence propensity to roll-over and may also reduce the driver's visibility. Consumers will simply not accept these changes, regardless of any added benefits that may result for these changes. Accordingly, such systems are not viable "solutions" to the problems associated with rollover crashes.

Based upon the foregoing, it is clear that many currently known safety systems designed to protect a vehicle occupant during a rollover accident are inadequate or undesirable. Accordingly, it would be an advancement in the art to provide a new type of safety system that would protect vehicle occupants during rollover conditions and would overcome one or more of the problems/limitations discussed above. Such a system is disclosed herein.

BRIEF SUMMARY OF THE INVENTION

The present invention is a safety system that may be installed on one or more of the front seats of the vehicle. This safety system will include a sensor that is designed to sense/detect that the vehicle is experiencing a rollover. One or more support members are also added to the safety system. The support member has an undeployed mode and a deployed mode. In the undeployed mode, the support members will be housed within the front seat of the vehicle. Accordingly, prior to deployment, the support member will generally be hidden from the vehicle occupant. In most embodiments, the support member will generally extend along the entire vertical length of the seats. More importantly, the support member will also be anchored/attached to the floor pan of the vehicle or lower structure of the seat. This attachment may be permanent or only effected when the lower part of the support structure is deployed.

Generally, the support member will include at least one deploying member and at least one extending member. The deploying member is designed such that it is capable of extending (i.e., increasing the longitudinal length) of the extending member. Generally, deployment of the support member entails having the deploying member extend the longitudinal length of the extending member.

In order to have the energy requisite to extend the extending member, the deploying member will include a stored energy source. In some embodiments, the stored energy source may comprise a pyrotechnic, a spring, a vessel containing pressurized gas. Other types of devices containing energy sufficient to deploy the extending member may also be used.

When the support member is in the deployed mode, the support member causes effective engagement with the vehicle roof to limit reduction in the distance between the roof and floor in the vicinity of the seat during rollover conditions. In some embodiments, this effective engagement will occur by having the support member (in the deployed mode) directly contact the vehicle roof. However, in other embodiments, the support member in the deployed mode will stop short of the roof, but will still be positioned such that if the roof begins to collapse downward towards the occupant, the position of the support member will limit this downward movement. In either case, the support member is causing "effective engagement" with the roof to occur and will thus be within the scope of the present embodiments.

In some of the present embodiments, the support member will cause effective engagement with the vehicle roof via the seat's headrest—i.e., the headrest of the seat is moved into a position in which it will contact/effectively engage the vehicle roof. Other embodiments may also be constructed in which all or a portion of the extending member exits the headrest/seat during deployment. In these embodiments, the extending member will actually contact/effectively engage the vehicle roof.

By having the support member in the deployed mode effectively engage the vehicle roof and floor, significant advantages may be enjoyed. Specifically, the support member in the deployed mode will provide additional rigidity to the roof and may prevent the vehicle roof from collapsing/impinging upon the occupant (or occupants' head) during the rollover. Moreover, by having the support member also coupled to the floor pan may provide additional benefits during rollover in that the support member will provide lateral rigidity to the roof by providing triangulated support to the roof and the vehicle side.

Embodiments of the present invention may also be constructed such that the support member will actually interact with and/or interlock with a portion of the roof. This type of interaction with the roof may be done directly by the support member and/or through the headrest of the front seat. In some instances, this type of interlocking and/or interaction with the roof will increase the support to the roof (and/or vehicle body) provided by the safety system by effectively linking the roof of the vehicle to the vehicle's floor pan.

Further embodiments may be constructed such that when the support member has been deployed into effective engagement with the roof, the floor pan will deform and move away from the vehicle roof. In turn, this movement of the floor pan allows the seat to move in the same direction as the vehicle roof maintaining the distance between roof and seat. The coupling of the roof to the floor, with a rigid member, allows for both deformation of both roof and floorpan while minimizing the decrease in distance between the roof and floor. This allows for dissipation of some of the vehicle kinetic energy, to minimize subsequent rolling, whilst maintaining a survival space for the occupant.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
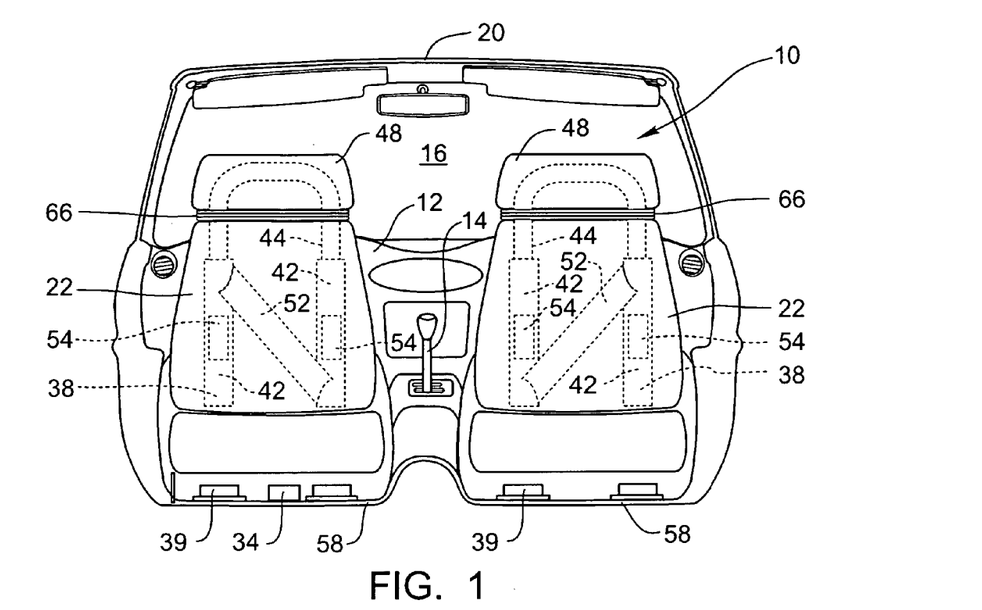
FIG. 1 is a rear sectional view of a vehicle interior that includes an embodiment of the safety system in the undeployed mode.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention. Referring now to FIG. 1, a sectional view of a vehicle interior 10 is illustrated. The view illustrated in FIG. 1 is depicted as if the reader is seated in a rear passenger seat of the vehicle. Accordingly, the vehicle interior 10 includes a dashboard 12, a gear shift 14, a windshield 16, etc. Those of skill in the art will recognize that other features commonly found in motor vehicles, though not shown in FIG. 1, may also be included within the vehicle interior 10 (including a glove box, instrument panel, steering wheel, pedals, undeployed airbags, etc.). A vehicle roof 20 is also positioned above the vehicle interior 10.

The vehicle interior 10 also includes two front vehicle seats 22. These vehicle seats 22 are designed such that the vehicle driver and a front seat passenger may ride in the vehicle. As shown in FIG. 1, the seats 22 comprise standard "bucket" seats. Of course, in other embodiments, the seats 22 may be "bench" seats or other types of vehicle seats known in the art.

The vehicle interior 10 may also be installed with a safety system 30 that is designed to protect a vehicle occupant (shown in FIG. 3) during rollover conditions. As is known in the art, "rollover conditions" mean that during an accident or crash, the vehicle becomes inverted such that the vehicle's tires are positioned above the vehicle's roof for some definite amount of time (typically in the order of 1 second). Because the vehicle becomes inverted during rollover conditions, this type of vehicle accident usually causes the occupant to invert (at least for a split second) such that the occupant's feet become positioned above the occupant's head. Moreover, there are rollover accidents where the vehicle comes to rest in an inverted position. As noted above, rollover conditions can be very hazardous to the vehicle occupants in that it may cause (among other things) the vehicle's roof to collapse down upon the occupant's head—i.e., when the vehicle becomes inverted, the roof of the inverted vehicle will contact the ground and may be deformed inward onto the occupant's head.

The safety system 30 may include a sensor 34 that is designed to sense rollover conditions. As shown in FIG. 1, the sensor 34 (represented graphically by a box) is positioned along the floor of the vehicle interior 10. However, other positions/locations within the vehicle interior 10 (or even on the outside of the vehicle) are also possible. The sensor 34 will detect the rollover conditions by detecting any one of a variety of known physical parameters of the vehicle. In most embodiments, the sensor 34 will be designed such that it will signal/indicate to the safety system 30 that the vehicle is experiencing a rollover.

The safety system 30 also includes one or more support members 38 (shown in phantom lines) that have an undeployed mode and a deployed mode. As shown in FIG. 1, the support members 38 are positioned in the undeployed mode. (The deployed mode will be shown and described in conjunction with FIGS. 2 and 3). The support members 38 are designed such that in the undeployed mode, the support members 38 will be housed within the vehicle seats 22. As such, prior to deployment, the support members 38 will be hidden from the vehicle occupant.

As shown in FIG. 1, each of the vehicle seats 22 has its own support member 38 contained therein. However, in other embodiments, (such as the type that would be used in conjunction with "bench" seats), more than one support member 38 may be housed within a vehicle seat 22. Likewise, other embodiments may be constructed in which the support member 38 is only positioned in one of the seats 22—i.e., the support member 38 is only in the driver's seat or is only in the passenger seat.

The support members 38 found in the safety system 30 are made of metal, plastic materials (including thermoplastics), or other suitable materials. The support member 38 may comprise a variety of different shapes and configurations. As shown in FIG. 1, one of the presently preferred embodiments will have the support member 38 be shaped as a strut or piston. Of course, other structures, shapes, and/or configurations may be used for the support member 38 depending on the particular embodiment.

In the embodiment shown in FIG. 1, the support member 38 comprises two distinct elements, namely a deploying member 42 and an extending member 44. More than one deploying member 42 and/or more than one extending member 44 may also be used. The deploying member 42 is designed such that it is capable of extending (i.e., increasing the longitudinal length) the extending member 44. In the embodiment shown in FIG. 1, two deploying members 42 are used in conjunction with one extending member 44. This extending member 44 is a "U-shaped" bar that is capable of being extended upwards towards the vehicle roof 20 (as will be explained in greater detail below). The bent portion of the "U-shaped" extending member is preferably positioned within the headrest 48 of the vehicle seat. A cross-piece 52 may also be added to the support member 38 as a means of linking and supporting the two deploying members 42. Such linking of the deploying members 42 is generally done for increased rigidity and/or structural integrity of the support member 38. This cross-piece 52 may be anchored to the deploying members 42 via fasteners (such as screws, bolts, adhesive, welding, etc.).

The deploying members 42 will generally include a stored energy source 54 (represented graphically as a box) in order to have the energy sufficient to deploy/extend the extending member 44. In some embodiments, the stored energy source 54 may comprise a pyrotechnic, a spring, or a vessel containing pressurized gas. Other types of devices that are capable of providing/storing energy sufficient to deploy the extending member 44 may also be used as the energy source 54.

In the embodiment shown in FIG. 1, the support members 38 extend along the entire vertical height of the seats 22. The support members 38 may be additional components in the seat assembly 22 or they may be an integral part of the normal seat frame structure.

Figure 2:
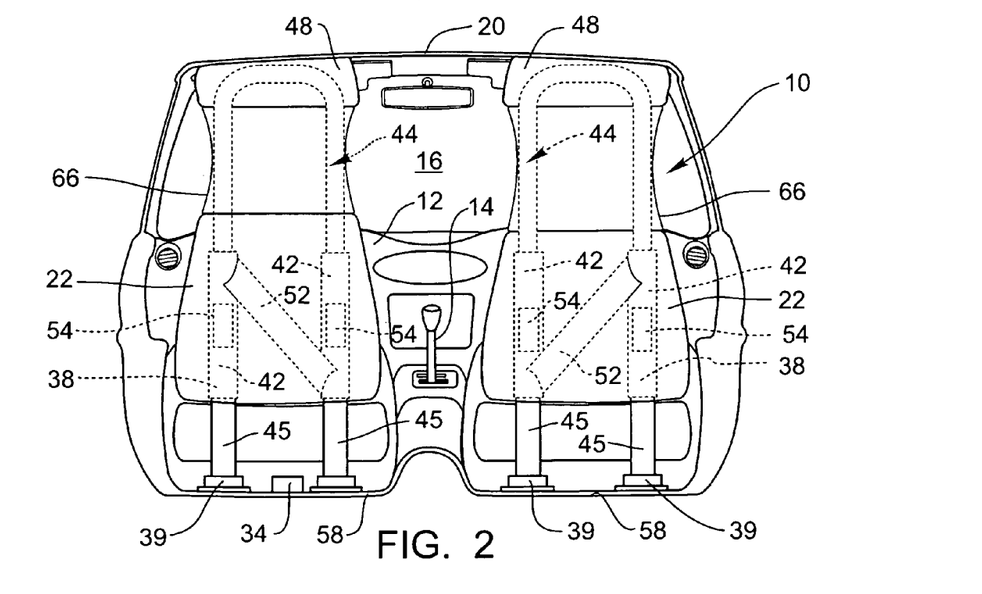
FIG. 2 is a rear sectional view of a vehicle interior of FIG. 1 in which the safety system is in the deployed mode.

Referring now to FIG. 2, a sectional view of the vehicle interior 10 illustrates the safety system 30 in a deployed mode. Specifically, in the event that the sensor 34 senses a rollover condition, a signal will be sent by the sensor 34 to a controller 60 (represented graphically as a box). This controller 60 is a processing device (such as a computer, microcontroller, processor etc.) that controls deployment of the safety system 30. Upon receipt of the signal from the sensor 34, the controller 60 sends a signal that will cause the support member 38 to deploy into the deployed mode. Generally, such deployment will occur by having the stored energy source(s) 54 release stored energy in a manner that causes the extending member 44 and to extend upwards towards the vehicle roof 20 and the extending member 44 to extend downwards towards the vehicle floorpan.

It is known in the art that the nature of rollover accidents is such that the vehicle roof 20 will contact the ground no sooner than 500 milliseconds after the event has been sensed by the sensor 34. This means that the deployment of the support member 38 can occur relatively slowly (with respect to other automobile safety systems) and with little potential for injury during deployment.

When the support member 38 is deployed, extending member 44 advances into effective engagement with the vehicle roof 20. The extending member 45 (shown in FIG. 2) advances into effective engagement with the vehicle floor pan. Both members 44, 45 are locked in the extended position by some means that will ensure that they form a rigid structure able to transmit the crushing force on the roof to the floor pan without buckling significantly, thereby limiting movement of the roof 20 toward the vehicle seat 22 during rollover conditions. As used herein, the terms "effective engagement" or "effectively engage(s)" means that the extending member 44 will either contact the vehicle roof 20 directly or will be positioned proximate the vehicle roof 20 such that it will limit the roof 20 from collapsing/compressing into a safety zone for the vehicle occupant. In fact, the inclusion of the support member 38 may operate to maximize the safety zone for a vehicle occupant during a rollover. Thus, for example, embodiments may be constructed such that when in the deployed mode, the support member 38 deploys a sufficient length such that there is direct contact between the extending member 44 and the roof 20. However, in other embodiments, the extending member 44 in the deployed mode will stop short of the roof 20 (i.e., it will be positioned an inch below the roof, two inches below the roof, some other distance etc.), but will still be positioned such that if the roof 20 begins to collapse downward upon the occupant, the position of the support member 38 will limit this downward movement. In either case, the support member 38 is causing "effective engagement" with the roof 20 to occur and will thus be within the scope of the present embodiments. Similarly, the extending member 45 in the deployed mode, may (in some embodiments) stop short of the vehicle floor pan but will still be positioned such that if the roof 20 begins to collapse downward on the occupant the whole of the support member 38 will move with the downward motion of the roof until the support member 38 will prevent further reduction in the distance between the roof 20 and the floor pan 58.

It should be noted that in the embodiment shown in FIG. 2, the support member 38 causes effective engagement with the vehicle roof 20 via the headrest 48—i.e., the headrest 48 is moved into a position in which it will contact/effectively engage the vehicle roof 20. Accordingly, in this embodiment, the extending member 44 remains housed within the vehicle seat 22 and the headrest 48 at all times. Other embodiments may also be constructed in which all or a portion of the extending member 44 exits the headrest 48/seat 22 during deployment. In these embodiments, the extending member 44 will actually contact/effectively engage the vehicle roof 20. In yet further embodiments, the extending member 44 will cause an external member/feature to contact/effectively engage the roof 20.

It should also be noted that in the embodiment shown in FIGS. 1 and 2, the extending member 45 engages with receivers 39 attached to the vehicle floor pan 58. The receivers 39 may also be features such as depressions or sockets formed directly in the floor pan 58. Although not essential to the function of the support frame 38, these receivers 39 may provide enhanced performance by limiting any translation of the extending member 45 relative to the floor pan 58. The shape of the receivers 39 would be such as to accommodate seat adjustment positioning. In some embodiments, the receivers 39 will be positioned outside of the vehicle seat whereas in other embodiments, the receivers 39 will be positioned inside of a lower portion of the seat.

The present embodiments of the safety system 30 will provide significant safety advantages over that which is previously known in the art. For example, by deploying the support member 38 into the deployed mode, there will be effective engagement with the vehicle roof 20. Such effective engagement may provide additional protection to a vehicle occupant during rollover conditions in that it provides additional rigidity to the roof 20 and may prevent the vehicle roof 20 from collapsing/impinging upon the occupant (or occupants' head) during the rollover. Such effective engagement may also operate to maximize the "safety zone" for a vehicle occupant during a rollover. Moreover, by having the support member 38 also coupled to the floor pan 58 additional benefits are provided during rollover in that the support member 38 will provide lateral rigidity to the roof by providing triangulated support to the roof 20 and the vehicle side by using the seat 22 as a "strut" member that supports the roof/vehicle body.

Figure 4:
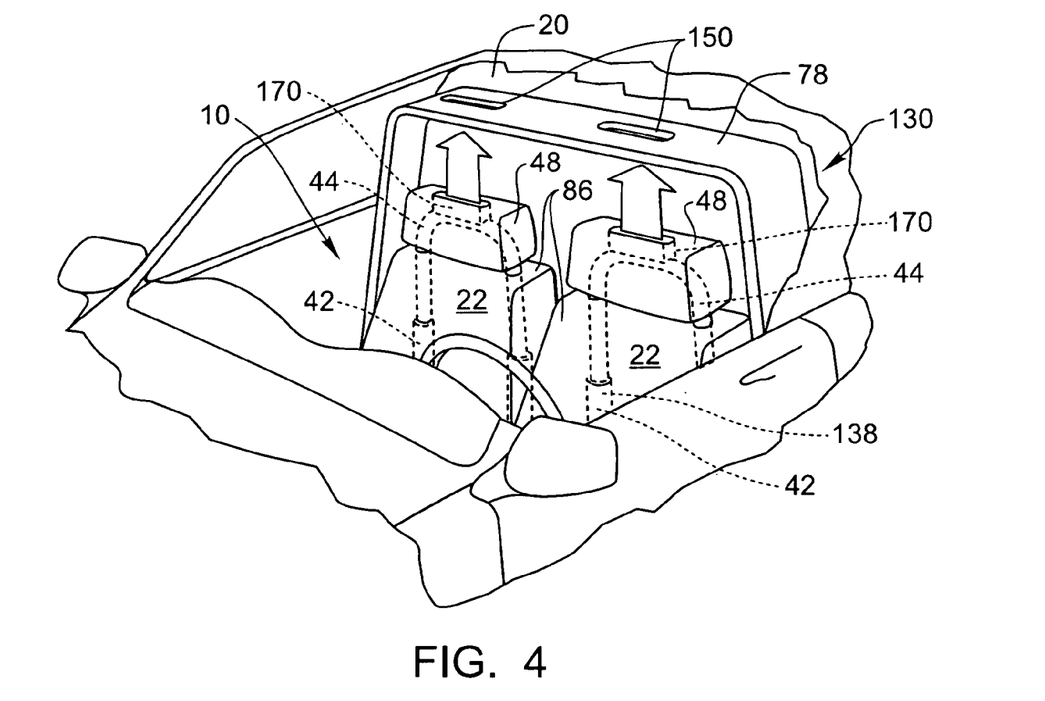
FIG. 4 is a cutaway perspective view a vehicle interior which includes a further embodiment of a safety system of the present invention.

In some of the presently known embodiments, the effective engagement between the roof 20 and the support member 38 is accomplished by having the deployed extending member 44 interact with the roof 20. In other embodiments, such effective engagement occurs by having the deployed extending member 44 interact with the roof 20 nest and/or fit into an indentation positioned in the roof 20. Such nesting of the deployed extending member 44 may, in some embodiments, be desirable in that it will prevent the deployed extending member 44 from laterally deflecting and/or moving out of the optimal position during a rollover. Of course, further embodiments may also be configured such that the effective engagement occurs by having all or a portion of the extending member 44 interlock with a portion of the roof 20 (as illustrated in FIG. 4).

In many embodiments, the safety system 30 is not designed to replace many currently known rollover protection systems such as seat belt pretensioning systems or side curtain airbags. Rather, many of the present embodiments are designed such that the safety system 30 may be an additional safety feature used in conjunction with seatbelt pretensioning systems/side curtain airbag systems. For example, many known seatbelt pretensioning systems or side curtain airbag systems are often anchored/attached to the vehicle roof 20. By using the safety system 30 of the present embodiments, the safety system 30 will increase the rigidity of the roof 20 and may maintain the vehicle roof 20 in a position that allows the belt pretensioning system/side curtain airbag system to provide optimal protection. As such, the overall restraint/effectiveness of the seatbelt pretensioning systems or side curtain airbag systems may be increased.

Figure 3:
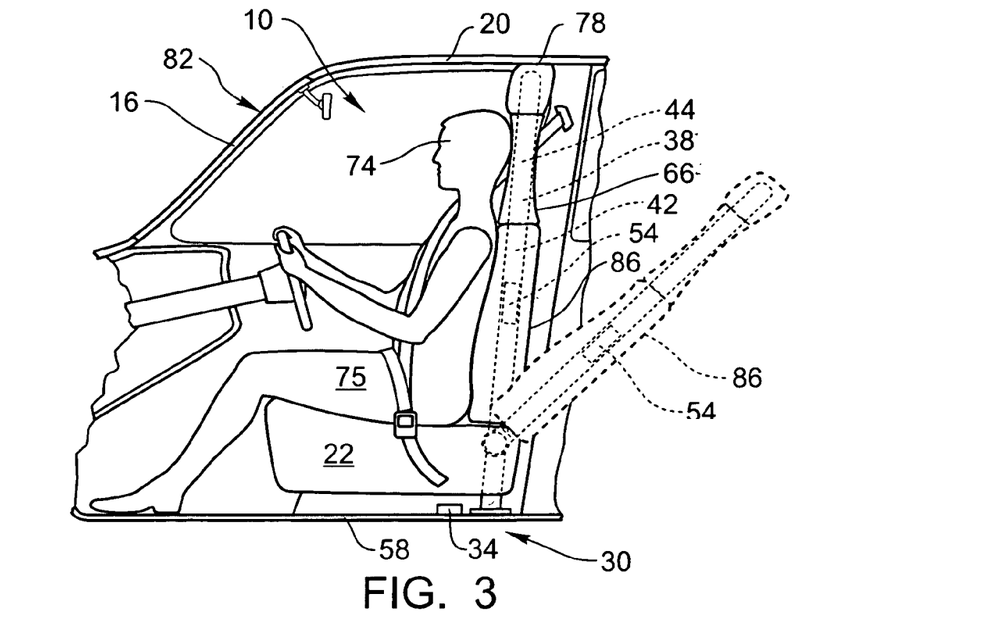
FIG. 3 is a cutaway side sectional view of the vehicle interior of FIG. 2 showing the seat back in a substantially vertical disposition and a reclined seat back in phantom lines.

Referring now to FIG. 3, a side sectional view of the vehicle interior 10 including the safety system 30 is illustrated with an occupant 75 in a vehicle with a right-side steering wheel. Of course, a similar configuration can be used for a vehicle with a left side steering wheel, for example, as shown in FIG. 4. As with FIG. 2, the support member 38 is shown in FIG. 3 as being in the deployed mode. As shown in the FIG. 3, the vehicle seat 22 may include a padded expandable portion 66 that is designed to cover the extending member 44. The purpose of the padded expandable portion 66 is so that, even when the support member 38 is in the deployed mode, the support member 38 will still be covered by some padding, and will provide head and neck support for the occupant. Thus, this padding will provide a softer surface for the occupant 75/occupant's head 74 and will reduce the likelihood that the occupant 75/occupant's head 74 will collide with the deployed support member 38 and cause injury.

In the embodiment shown in FIG. 3, the safety system 30 is not designed to eliminate entirely the intrusion/deformation of the vehicle roof 20 into vehicle interior 10. Rather, the embodiments of the safety system 30 are designed to limit this intrusion to prevent the roof 20 from contacting the vehicle occupant 75. In many instances, the buckling/deformation of the vehicle roof 20 is an important part of the energy absorption process during a rollover crash (in the same way that frontal collisions use buckling of the vehicle body to dissipate some of the energy of the crash). Accordingly, if the roof structure is made too rigid (so that there is no buckling/deformation of the roof structure), then there is a risk that the energy of the rollover crash will not be dissipated as quickly and the vehicle will continue to roll for longer periods of time and successive rolls.

Thus, the embodiments of the safety system 30 are designed such that the support member will ensure that the roof 20 will not impinge upon the occupant 75, but at the same time, still provide sufficient flexibility such that all or a portion of the vehicle roof 20 will deform/buckle to dissipate energy. Generally, this is accomplished by configuring the system 30 such that during a rollover, the portions 78 of the roof 20 that effectively engage the support member 38 will be maintained above the vehicle occupant 75 (i.e., there will be little or restricted compression of this portion 78 of the roof 20 and/or the support structures associated with the roof 20). At the same time, the system 30 is designed such that other areas of the roof 20, including the windshield portion 82, may compress/deform/buckle inwardly as a means of absorbing/dissipating some of the crash energy of the rollover. Other embodiments will be constructed in which the entire roof 20 will compress during a rollover, but the amount of compression will be significantly reduced due to the deployed support member 38. Of course, other methods of configuring the system 30 such that it will provide impact protection to the occupant 75 and still allow the roof 20 to dissipate the energy of the rollover, may also be used.

Referring still to FIG. 3, an additional feature of the safety system 30 is illustrated. It is known in the art that many currently designed vehicle seats 22 will allow the seatback 86 to recline into a reclined position (as shown in phantom lines). If the seatback 86 is reclined past a certain pre-determined angle, no advantage would be provided by the safety system 30 because, even if the safety system 30 did deploy, the angle of the seatback 86 would be such that the support member 38 would not effectively engage the vehicle roof 20 (i.e., the support member 38 would not reach the roof 20). Moreover, if such deployment did occur with the seatback 86 being reclined past a certain pre-determined angle, there would be a significant risk that such deployment could injure a passenger seated in a vehicle's rear seat. Accordingly, in such situations where the seatback 86 is reclined past a specific pre-determined angle, the controller 60 will override any signal received from the sensor 34 and will prevent the deployment of the support member 38. Thus, in these situations of a reclined front seat 22, deployment is prevented.

It should be noted that the exact angle/position above which the controller 60 prevents deployment of the support member 38 will depend on a variety of factors including the dimensions of the vehicle, the dimensions of the seat, etc. Those of skill in the art will recognize how to program/implement the controller 60 to use such factors (as well as other factors) to determine whether the angle of the seatback 86 is such that deployment should not occur.

Referring now to FIG. 4, an additional embodiment is illustrated. As with the previous embodiment described above, FIG. 4 discloses a safety system 130 that is similar to the safety system 30 discussed above. Specifically, the safety system 130 includes a support member 138 designed to cause effective engagement with the vehicle roof 20 when the support member 138 is in the deployed mode. However, unlike the embodiments discussed above, the effective engagement of the support member 138 is caused by having the support member 138 interlock with an opening 150 in the occupant portion 78 of the vehicle roof 20. In other words, the support member 138 will break through the headrest 48 and will mate with an opening 150 positioned in the roof 20, as illustrated by the arrows. To facilitate this engagement, an interlocking feature 170 may also be added to one or more of the support members 138. Of course, other embodiments may be constructed in which a portion of the headrest 48 interlocks/mates with the roof 20.

This type of interlocking between the support member 138 and the roof 20 may provide additional benefits. Specifically, the interlocking will increase the lateral rigidity of the roof 20 by ensuring that the seat 22 provides triangulated support to the roof 20 and the vehicle body. Likewise, the interlocking will reduce the likelihood that the roof 20 will be compressed down onto the occupant/occupant's head during a rollover is significantly reduced. Accordingly, in some of the presently preferred embodiments, interlocking between the support member 138 (or the headrest 48) and the roof 20 is preferred.

Figure 5:
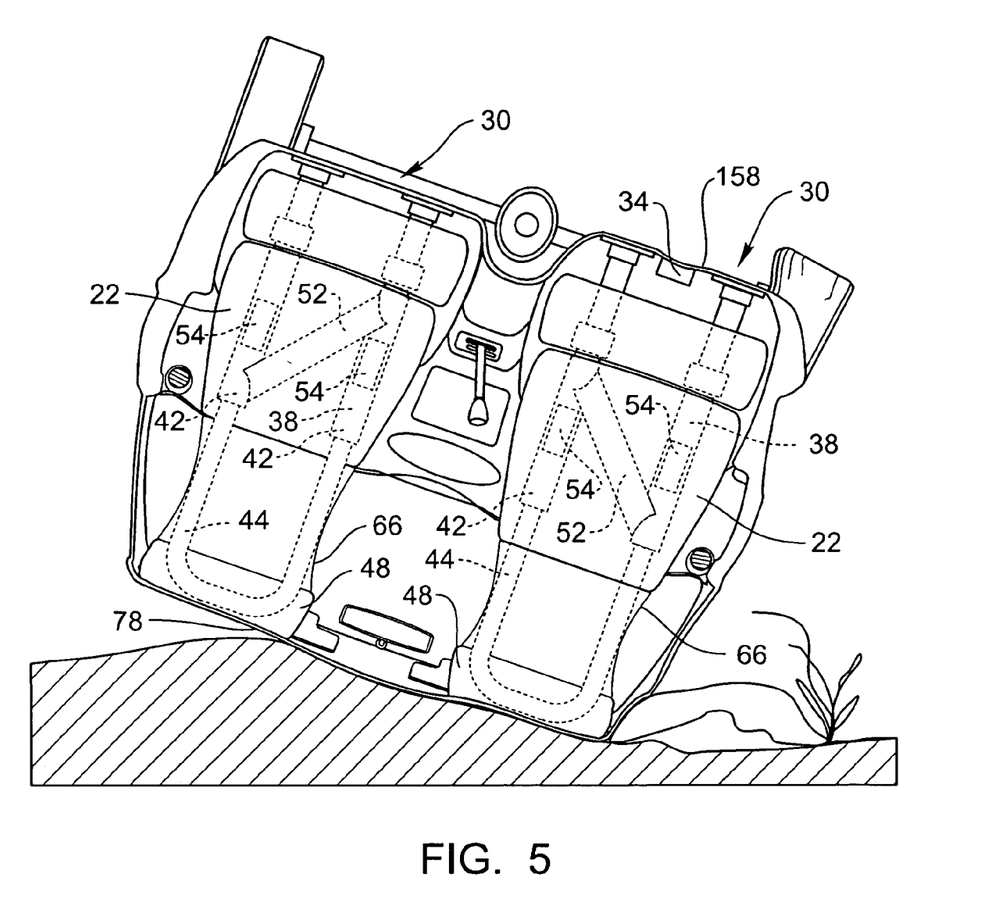
FIG. 5 is a sectional view a vehicle interior inverted to illustrate a rollover which shows an additional feature of the present embodiments.

FIG. 5 shows a vehicle that is inverted as a result of a rollover crash. As can be seen in FIG. 5, the safety system 30 (which is included in the vehicle interior 10) may support the roof 20 and/or maximize the safety zone around the occupant (shown in FIG. 3) in the event that the vehicle comes to rest in an inverted position.

FIG. 5 also shows an additional feature of the safety system 30 is illustrated. As can be seen in FIG. 5, the safety system 30 has been deployed in response to rollover conditions and has (as shown in FIG. 4) interlocked with the occupant portion 78 of the roof 20. However, in these embodiments, the floor pan 158 may be made such that when the roof 20 begins to compress inward toward the seat 22, the floor pan 158 will likewise move in the same direction of the roof compression—thereby allowing the seat to move away from the collapsing vehicle roof 20. Such downward movement of the floor pan 158 may be accomplished by constructing the floor pan 158 of a deformable material that will deform to allow the seat 22 to move when the rollover occurs. In addition to this movement of the seat 22, the deformation of the floorpan 158 described above, will absorb additional energy from the rolling vehicle and help reduce the continued motion of the vehicle.

Figure 6:
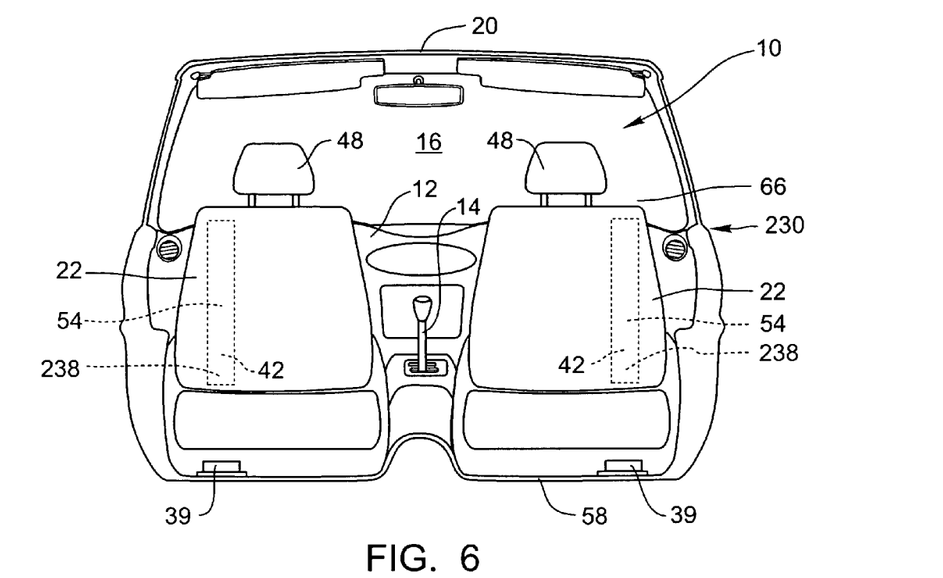
FIG. 6 is a rear sectional view of a vehicle interior that includes another embodiment of a safety system in the undeployed mode.

Referring now to FIG. 6, another embodiment of a safety system 230 that may be used in a vehicle interior 10. The safety system 230 includes a support member 238 that is similar to the support members 38, 138 discussed above. For purposes of brevity, the above-recited description will not be repeated.

However, unlike the embodiments described above, the support member 238 is only a single column that is positioned within the seat 22. As shown in FIG. 6, the support member 238 is positioned proximate the outboard edge of the vehicle seat 22. Other embodiments may be constructed in which the support member 238 is positioned proximate the center or the inboard edge of the seat 22. In fact, any position within the seat 22 may be used for the support member 238.

In the embodiment shown in FIG. 6, the support member 238 is positioned such that it is parallel to the axis of the seat back. Other embodiments may also be constructed in which the support member 238 is positioned at an angle within the seat back. In other embodiments, the support member may have a vertical alignment within the seat back.

Figure 7:
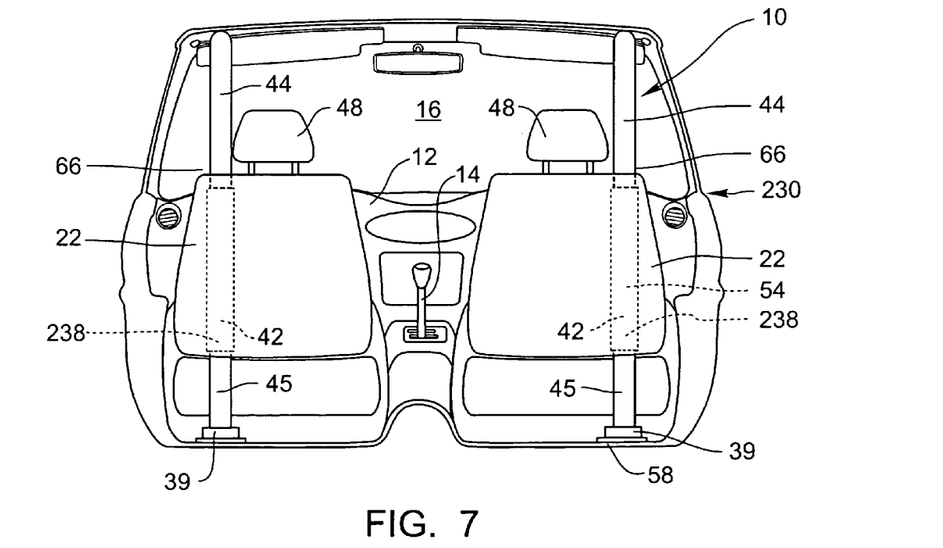
FIG. 7 is a rear sectional view of the vehicle interior of FIG. 6 in which the safety system is in the deployed mode.

Referring now to FIG. 7, the embodiment of the safety system 230 of FIG. 6 is illustrated after the support member 238 has deployed. As seen in FIG. 7, the extending members 44 and 45 have deployed from the support members 238. Such deployment causes the extending members 44 to effectively engage the roof 20 and the extending members 45 to effectively engage the floor pan 58. As shown in FIG. 7, the deployment of the support members 238 causes the extending members 44, 45 to deploy through the seat 22. Other embodiments will be designed such that the deployment of the extending members 44, 45 will not deploy through the seat 22, but rather, will move a portion of the seat 22.

Further, it should be noted that in the embodiment shown in FIG. 7, the deployment of the support member 238 will not interfere with other safety features/system in the vehicle, such as side curtain airbag systems, seat belt systems, etc. Rather, the safety system 230 is designed such that it may be used in conjunction with the other safety features present in the vehicle interior.

Figure 8:
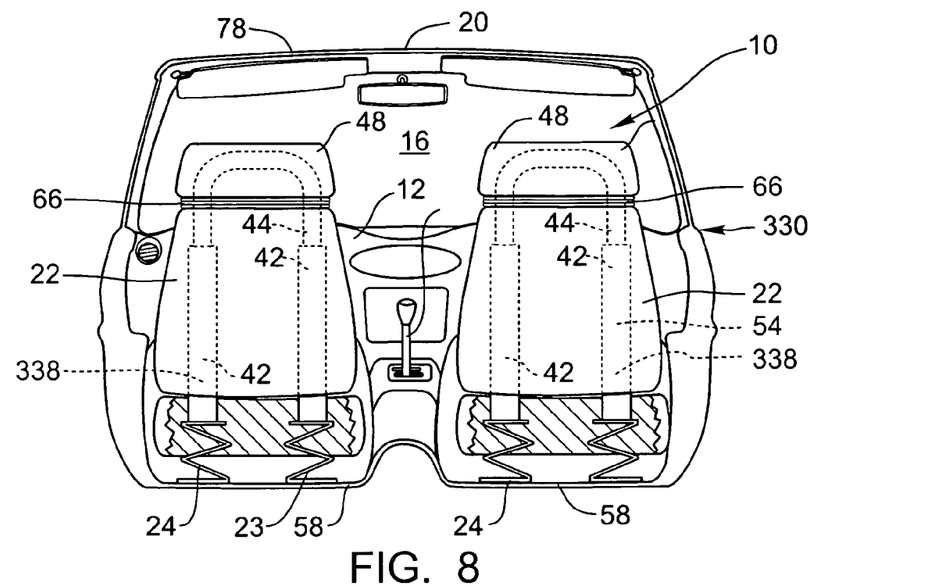
FIG. 8 is a rear sectional view of a vehicle interior that includes another embodiment of a safety system in the undeployed mode.
Figure 9:
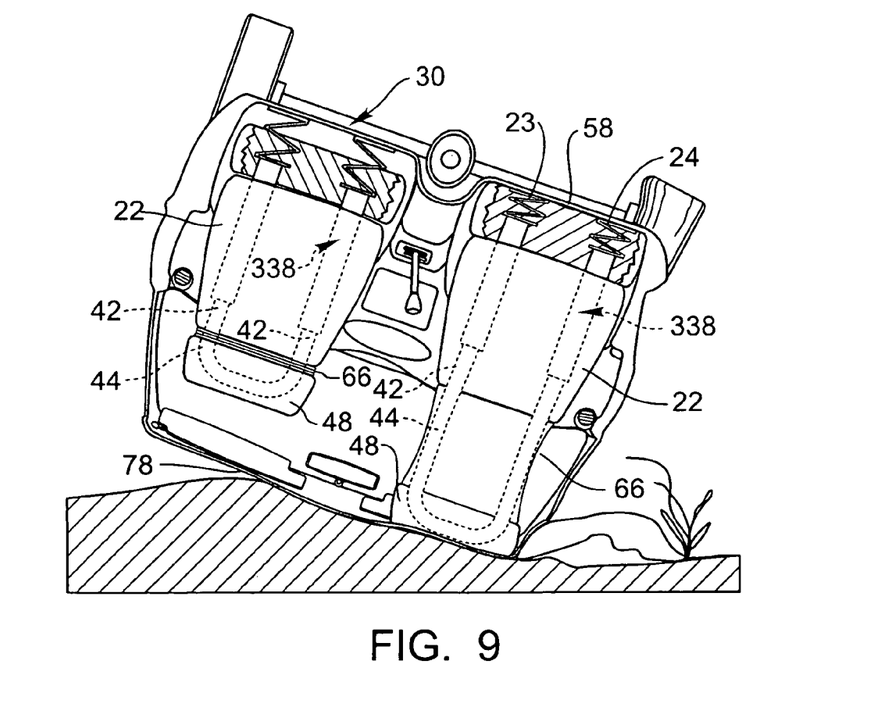
FIG. 9 is a sectional view of the embodiment of FIG. 8 in which the vehicle interior inverted to illustrate a rollover.

Referring now to FIG. 8, a further embodiment of the safety system 330 is shown. In this embodiment, the support member 338 is directly connected to the part of the seat support structure 23. This part of the seat support structure 23 includes some deformable element 24 that will crush under an applied load greater than a certain limit. FIG. 9 shows the safety system 230 in the deployed condition after the roof 22 has impacted with the ground. As shown in FIG. 9, the deformable element 24 has reduced in height under the applied load from the support member 338, thus increasing the distance between the occupant portion 78 of the roof 20. Other exemplary embodiments may be constructed in which the connection between the floor pan 158 and the seat support structure 23 includes a "shear pin" that will rupture in the event of a rollover to allow movement of the seat 22. Other methods/mechanisms for allowing the seat 22 to move in the direction of the roof compression during a rollover may also be used.

As described herein, the movement of the seat 22 during a rollover provides additional protection for the vehicle occupant. Specifically, such movement of the seat 22 increases the distance between the top of the occupant's head 74 (shown in FIG. 3) and the underside of the roof 20, which in turn, means that the portion 78 of the roof 20 must be collapsed a greater distance before it will actually contact the occupant 75. As such, the likelihood that the roof 20 will actually contact the occupant during a rollover is reduced.

It should be noted that the moveable floor pan 158 disclosed herein (in FIG. 4) may be floor be used in conjunction with any of the embodiments disclosed herein. Further, the use of a moveable/deformable floor pan 158 is not intended to replace other existing safety features that are sometimes used on motor vehicles such as belt-in-seat systems or double diagonal seatbelt systems. Rather, this moveable/deformable floor pan 158 is designed to be used in conjunction with these types of seatbelt systems.

Referring now to FIGS. 1-9 generally, the present embodiments also provide a method for providing protection to a vehicle occupant 75 during a rollover. This method involves obtaining a safety system and installing this system onto a vehicle interior 10. This safety system may be either the system 30, 130, 230, 330 or any other system in keeping with the spirit of the present invention. Once the system 30 (or 130, 230, 330) is obtained, the rollover conditions must be sensed using the sensor 34. Upon sensing the rollover, the support member 38 (or 138) is deployed. Of course, depending on which system 30, 130 is used, additional embodiments may include the further steps of moving the seat 22 away from the vehicle roof (via the deformable floor pan 158, deformable element 24, etc.) and/or interlocking the support member 30 with an opening 150 in the roof, interlocking the extending member 45 with a portion of the vehicle floor, etc.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A vehicle safety system comprising:
   a vehicle seat; and
   a support member having an undeployed mode and a deployed mode, the support member being housed at least in part within the vehicle seat when the support member is in the undeployed mode, the support member being converted from the undeployed mode into the deployed mode upon receiving a signal indicating rollover conditions, wherein the support member in the deployed mode is disposed in effective engagement with the vehicle roof to limit movement of part of the roof toward the vehicle seat during the rollover condition, wherein the system is prevented from deploying if the vehicle seat is reclined beyond a pre-determined angle.

2. A vehicle safety system as in claim 1 wherein the support member is effectively engaged with the floor pan of the vehicle in the deployed mode.

3. A vehicle safety system as in claim 2 wherein the support member deforms the floor pan during rollover conditions.

4. A vehicle safety system as in claim 1 wherein the vehicle seat has a headrest and the headrest is disposed in effective engagement with the roof, if the support member is in the deployed mode.

5. A vehicle safety system as in claim 1 wherein in the deployed mode, the support member interacts with the roof.

6. A vehicle safety system as in claim 5 wherein the support member interacts with the roof in interlocking engagement.

7. A vehicle safety system as in claim 5 wherein the support member interacts with the floor pan of the vehicle in interlocking engagement.

8. A vehicle safety system as in claim 1 wherein the support member comprises one or more deploying members that causes the support member to convert into the deployed mode.

9. A vehicle safety system as in claim 1 wherein the support member extends along the entire height of the seat.

10. A vehicle safety system as in claim 1 wherein the seat moves towards the vehicle floor pan during rollover conditions due to forces transmitted from the roof to a defomable element in the seat base by a support structure.

11. A vehicle safety system comprising:
    a sensor that detects rollover conditions and generates a signal;
    a vehicle seat; and
    a support member having a undeployed mode and a deployed mode, the support member extending along the entire height of the vehicle seat and being anchored to a floor pan of the vehicle, the support member being housed at least in part within the vehicle seat when the support member is in the undeployed mode, the support member being converted from the undeployed mode into the deployed mode upon receiving a signal indicating rollover conditions, wherein the support member in the deployed mode is disposed in effective engagement with the vehicle roof to limit movement of the roof toward the vehicle seat during the rollover condition, wherein the system is prevented from deploying if the vehicle seat is reclined beyond a pre-determined angle.

12. A vehicle safety system as in claim 11 wherein the seat moves in conjunction with the vehicle roof during a rollover by deforming the floor pan.

13. A vehicle safety system as in claim 11 wherein the support member comprises a deploying member that causes the support member to convert into the deployed mode when the sensor detects a rollover.

14. A vehicle safety system as in claim 11 wherein the support member will interact with the vehicle roof when the support member is in the deployed mode.

15. A method for protecting a vehicle occupant comprising:
    installing a support member having a undeployed mode and a deployed mode into the vehicle, the support member being housed at least in part within the vehicle seat when the support member is in the undeployed mode, wherein the support member in the deployed mode is disposed in effective engagement with the vehicle roof to limit movement of the roof toward the vehicle seat during the rollover condition;
sensing rollover conditions using a sensor;
generating a signal upon sensing a rollover condition; and
converting the support member from the undeployed mode into the deployed mode in response to the a signal received from the sensor indicating a rollover condition, wherein the support member is prevented from deploying if the vehicle seat is reclined beyond a pre-determined angle.

16. A method for protecting a vehicle occupant as in claim 15 further comprising the step of moving the vehicle seal away from the vehicle roof during a rollover.

17. A method for protecting a vehicle occupant as in claim 15 wherein the support member is engaged to a floor pan in the vehicle.

18. A method for protecting a vehicle occupant as in claim 17 further comprising the step of deforming the floor pan.

19. A method for protecting a vehicle occupant as in claim 15 further comprising the step of interacting the support member with the roof.

* * * * *

UNITED STATES PATENT AND TRADEMARK OFFICE
CERTIFICATE OF CORRECTION

| | | |
|---|---|---|
| PATENT NO. | : 7,384,067 B2 | Page 1 of 1 |
| APPLICATION NO. | : 11/327801 | |
| DATED | : June 10, 2008 | |
| INVENTOR(S) | : Brent A. Parks et al. | |

It is certified that error appears in the above-identified patent and that said Letters Patent is hereby corrected as shown below:

In column 2, line 7, please replace "more resistance to buckling" with --more resistant to buckling--

In column 3, line 43, please replace "floorpan while minimizing the decrease" with --floor pan while minimizing the decrease--

In column 6, line 27, please replace "downwards towards the vehicle floorpan" with --downwards towards the vehicle floor pan--

In column 10, line 15, please replace "the deformation of the floorpan" with --the deformation of the floor pan--

In column 12, line 31, please replace "from the roof to a defomable" with --from the roof to a deformable--

In column 13, line 9, please replace "in response to the a signal" with --in response to the signal--

In column 14, line 2, please replace "moving the vehicle seal" with --moving the vehicle seat--

Signed and Sealed this

Fifth Day of August, 2008

JON W. DUDAS
*Director of the United States Patent and Trademark Office*